(12) United States Patent
Neill et al.

(10) Patent No.: US 10,328,638 B2
(45) Date of Patent: *Jun. 25, 2019

(54) ULTRASONICALLY WELDED MAT UNIT AND SYSTEM THEREOF

(71) Applicant: R&L Marketing & Sales, Inc., Youngstown, OH (US)

(72) Inventors: David M. Neill, Canfield, OH (US); Ronald N. Kessler, Girard, OH (US); Daniel Kirsch, Hermitage, PA (US); Keith Wittler, Montville, OH (US)

(73) Assignee: R&L Marketing & Sales, Inc., Youngstown, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/928,893

(22) Filed: Mar. 22, 2018

(65) Prior Publication Data

US 2018/0207880 A1    Jul. 26, 2018

Related U.S. Application Data

(63) Continuation of application No. 15/435,981, filed on Feb. 17, 2017, now Pat. No. 9,944,017.

(Continued)

(51) Int. Cl.
  *B32B 3/06* (2006.01)
  *A47L 23/26* (2006.01)
  (Continued)

(52) U.S. Cl.
  CPC ............ *B29C 65/08* (2013.01); *A47L 23/266* (2013.01); *B29C 65/02* (2013.01); *B29C 66/1122* (2013.01); *B29C 66/21* (2013.01); *B29C 66/41* (2013.01); *B29C 66/54* (2013.01); *B29C 66/71* (2013.01); *B29C 66/73754* (2013.01); *B29C 66/73756* (2013.01); *B32B 3/06* (2013.01); *B32B 3/30* (2013.01); *B32B 7/05* (2019.01); *B32B 25/042* (2013.01);
  (Continued)

(58) Field of Classification Search
  CPC ........ A47L 23/22; A47L 23/24; A47L 23/266; E04F 15/02038
  See application file for complete search history.

(56) References Cited

U.S. PATENT DOCUMENTS 1,756,380 A * 4/1930 Osborn .............. A47G 27/0225
                                                    15/244.4
3,518,153 A    6/1970 Slosberg et al.
(Continued)

*Primary Examiner* — Catherine A. Simone
(74) *Attorney, Agent, or Firm* — Sand, Sebolt & Wernow Co., LPA

(57) ABSTRACT

A mat unit includes a plurality of gaps defined by a first layer that are in open communication with gaps defined by a second layer so as to permit debris to fall entirely through both gaps to pass completely through the mat unit. The mat unit is part of an omnidirectional mat cleaning system that includes a first direction of travel above the mat unit extending through a door opening defined by a building structure. A different second direction of travel is above the mat unit extending through the door opening or another door opening defined by the building structure. The mat unit is installed on a floor adjacent the door opening. The mat unit cleans shoes regardless of the direction of travel traveled above the mat unit.

17 Claims, 9 Drawing Sheets

Related U.S. Application Data

(60) Provisional application No. 62/335,141, filed on May 12, 2016.

(51) Int. Cl.

| | | |
|---|---|---|
| *E04F 15/02* | (2006.01) | |
| *E04F 15/10* | (2006.01) | |
| *B32B 25/04* | (2006.01) | |
| *B32B 3/30* | (2006.01) | |
| *B32B 7/05* | (2019.01) | |
| *B29C 65/00* | (2006.01) | |
| *B29C 65/02* | (2006.01) | |
| *B29C 65/08* | (2006.01) | |
| *B29L 9/00* | (2006.01) | |
| *B29C 65/48* | (2006.01) | |
| *B29K 21/00* | (2006.01) | |
| *B29L 31/00* | (2006.01) | |
| *B29C 65/56* | (2006.01) | |

(52) U.S. Cl.
CPC .. *E04F 15/02038* (2013.01); *E04F 15/02161* (2013.01); *E04F 15/105* (2013.01); *B29C 65/483* (2013.01); *B29C 65/56* (2013.01); *B29C 66/229* (2013.01); *B29C 66/30321* (2013.01); *B29C 66/30325* (2013.01); *B29C 66/435* (2013.01); *B29C 66/8322* (2013.01); *B29C 66/9513* (2013.01); *B29K 2021/003* (2013.01); *B29L 2009/00* (2013.01); *B29L 2031/7324* (2013.01); *B32B 2471/04* (2013.01); *E04F 2201/0146* (2013.01); *E04F 2201/022* (2013.01)

(56) References Cited

U.S. PATENT DOCUMENTS

| | | |
|---|---|---|
| 4,167,599 A | 9/1979 | Nissinen |
| 5,815,995 A | 10/1998 | Adam |
| 5,958,538 A | 9/1999 | Kessler |
| 5,992,105 A | 11/1999 | Kessler et al. |
| 6,352,757 B1 | 3/2002 | Kessler et al. |
| 6,726,190 B2 | 4/2004 | Malpass et al. |
| 6,740,380 B2 | 5/2004 | Kessler |
| 8,424,257 B2 | 4/2013 | Jenkins et al. |
| 8,640,403 B2 | 2/2014 | Masanek, Jr. et al. |
| 9,339,132 B2 | 5/2016 | Burrell et al. |
| 9,487,923 B2 | 11/2016 | Masanek, Jr. et al. |
| 9,944,017 B2 * | 4/2018 | Neill ........................ B29C 65/08 |
| 2002/0020123 A1 | 2/2002 | Kessler et al. |
| 2002/0045021 A1 | 4/2002 | Brown et al. |
| 2004/0019994 A1 | 2/2004 | Kessler et al. |
| 2011/0244173 A1 | 10/2011 | Yang |
| 2013/0171432 A1 | 7/2013 | Dandapure et al. |
| 2014/0127449 A1 * | 5/2014 | Wang ................. A47G 27/0225 428/99 |
| 2014/0342126 A1 | 11/2014 | Oh |

* cited by examiner

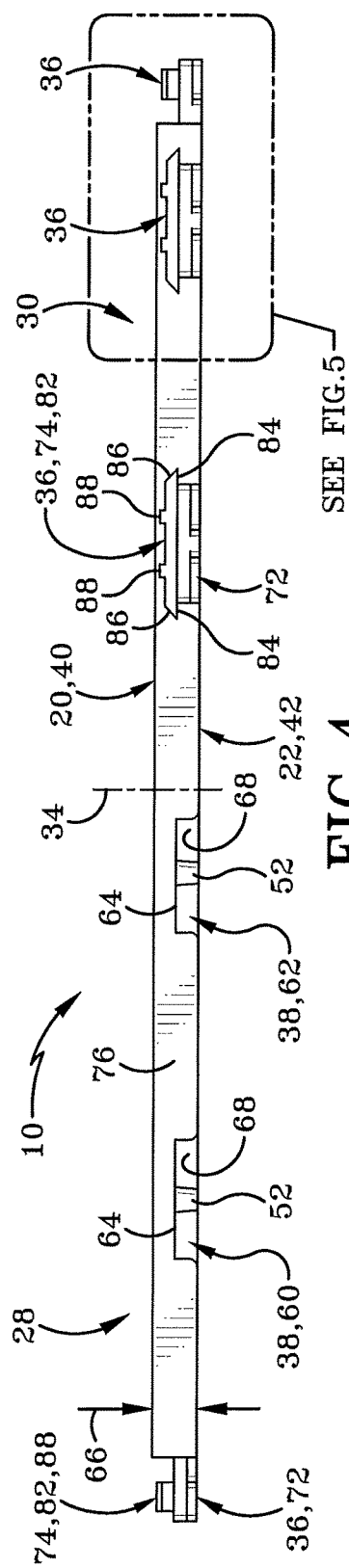
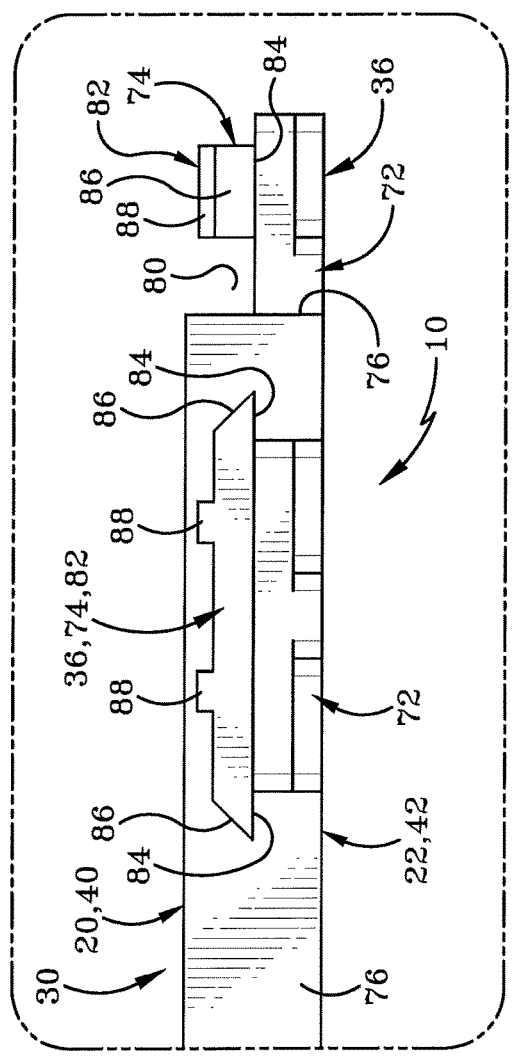
FIG.4
FIG.5

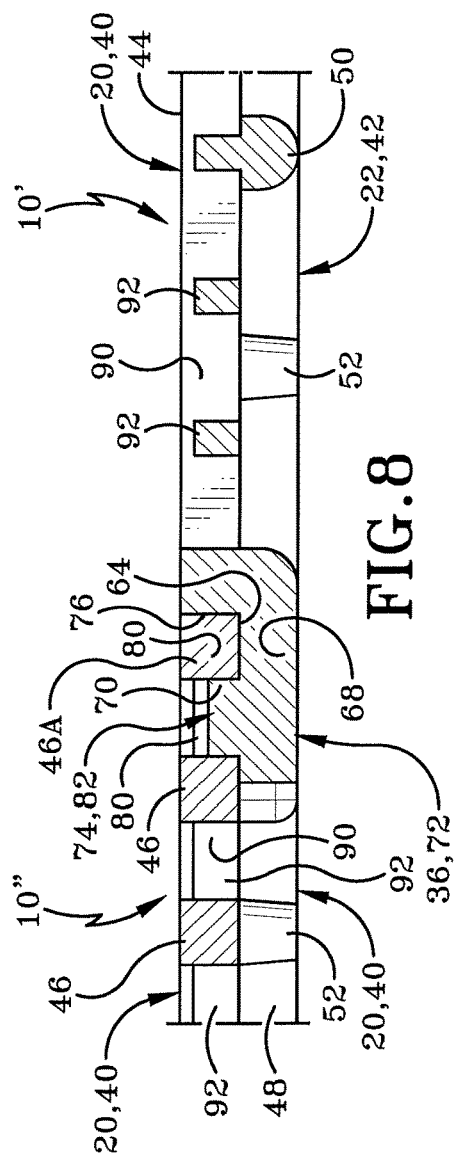
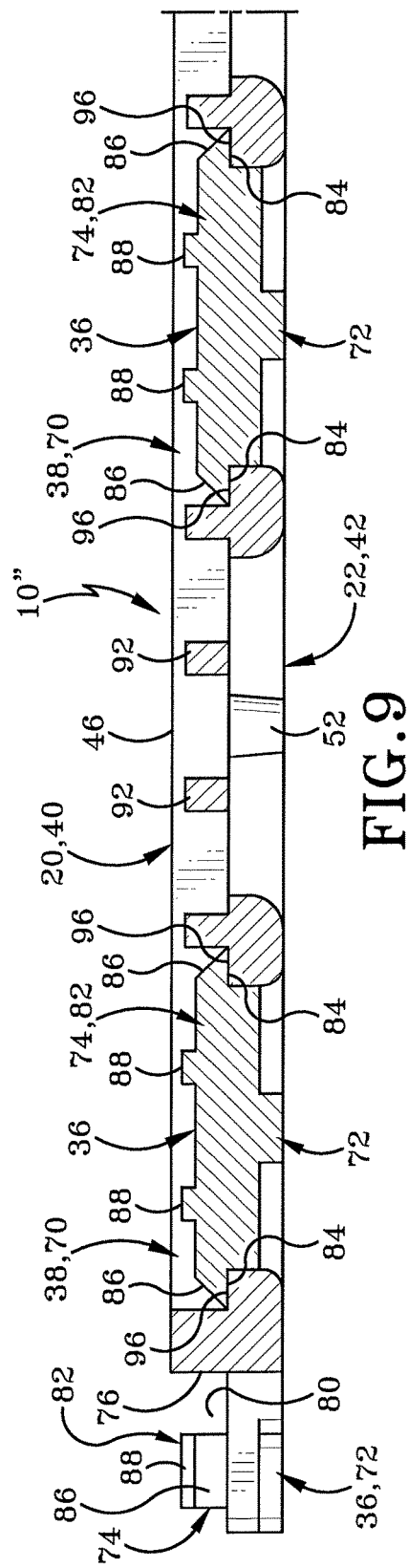

ULTRASONICALLY WELDED MAT UNIT AND SYSTEM THEREOF

CROSS REFERENCE TO RELATED APPLICATIONS

This application is a continuation application of U.S. Ser. No. 15/435,981, filed Feb. 17, 2017, which claims priority to U.S. Provisional Application Ser. No. 62/335,141, filed on May 12, 2016; the disclosure of which is incorporated herein by reference.

BACKGROUND

Technical Field

The present disclosure relates generally to flooring systems. Particularly, the present disclosure relates to mat systems, their directional cleaning of shoes, and their method of fabrication. Specifically, the present disclosure relates entrance mats configured to remove debris from shoes moving in any direction and that are fabricated from non-vinyl materials that do not release noxious chemicals and do not require adhesives to join multiple layers together.

Background Information

Entrance matting is often considered an essential safety item in commercial, industrial, and residential facilities, Generally, there are a significant number of types of matting for all types of needs. By way of non-limiting example, industrial facilities usually purchase entrance matting in areas where floors tend to be slippery from production residue or moisture. Offices with heavy walk-in traffic and normal employee traffic often purchase matting to create a safe treading condition as well as to protect the floor. Retail stores may have similar entrance matting as well.

Entrance matting also helps to prevent tracking dirt and water onto other floor areas. Some mats incorporate an absorbent upper layer to soak up water, snow, and other debris.

Typically, entrance mats and matting systems are fabricated from vinyl-based polymers. These materials may be molded into specific shapes and designs. However, the molding process requires that the vinyl-based material be heated to sufficiently mold it to the desired shape.

When the temperature of the vinyl-based material is raised for the molding process, there exists a potential danger for the release of noxious and potentially harmful or even toxic off gasses.

Even after the material has been formed to a desired shape, often two layers of formed material may be joined together with adhesive. Or, the absorbent top layer may be applied with adhesive. These adhesives may also release harmful or noxious odors/chemicals during the adhesive bonding and curing process

SUMMARY

Issues continue to exist with mats and mat systems fabricated from vinyl-based materials, and from the fabrication of mat systems requiring adhesive to bond some components together. Thus, a non-vinyl based mat and mat system that can be free of adhesives is needed. The present disclosure address these and other issues.

In one aspect, an embodiment of the present disclosure may provide a mat unit that is formed from at least two layers ultrasonically welded together. Each layer is individually formed form non-vinyl nontoxic thermoplastic elastomer (TPE) material. In ultrasonically joining the two layers together, there is no need to use additional materials, such as adhesive (i.e., chemical attachment) or stitched thread (i.e., mechanical attachment) to form the joint/weld point. Once formed from the two layers, the mat unit has four quadrants and a plurality of longitudinal ribs integrally formed in the first layer positioned in the first and third quadrants, and a plurality of transverse ribs integrally formed in the first layer positioned in the second and fourth quadrants. Additionally, there are a plurality of longitudinal ribs integrally formed in the second layer positioned in the second and fourth quadrants, and a plurality of transverse ribs integrally formed in the second layer positioned in the first and third quadrants.

In another aspect, an embodiment of the present disclosure may provide a method comprising the steps of: forming a first layer of a mat unit from non-vinyl nontoxic thermoplastic elastomer (TPE) material; forming a second layer of the mat unit from non-vinyl nontoxic TPE materials; curing, at least partially, the first and second layers; adjoining the first layer in direct contact with the second layer at a plurality of intersecting welding contact points; and welding the first and second layers together ultrasonically without any additional material bonding the first and second layers together. In this example, the step of forming the first layer may include the steps of: forming a plurality of transversely extending linear ribs; and forming a plurality of longitudinally extending linear ribs. This example may also include wherein the step of forming the second layer includes the steps of: forming a plurality of transversely extending linear ribs; forming a plurality of longitudinally extending linear ribs; and wherein the step of adjoining the first layer in direct contact with the second layer further includes the step of overlaying a transversely extending linear rib on the first layer with a longitudinally extending linear rib on the second layer; and overlaying a longitudinally extending linear rib on the first layer with a transversely extending rib on the second layer. This example may also include the steps of: forming a second mat unit identical to the first mat unit; aligning the second mat unit next to the first mat unit; connecting the first mat unit to the second mat unit with complementary male-female connectors. Further, this example may include the step of building a box-weave pattern from a plurality of mat units, each mat unit in the plurality ultrasonically formed identical to the first mat unit.

In yet another aspect, an embodiment of the present disclosure may provide an ultrasonically formed mat unit comprising: a first layer ultrasonically joined to the a second layer at a contact weld point formed from only material of the first and second layers; four quadrants, including a first quadrant, a second quadrant, a third quadrant, and a fourth quadrant; a plurality of longitudinal ribs integrally formed in the first layer positioned in the first and third quadrants, and a plurality of transverse ribs integrally formed in the first layer positioned in the second and fourth quadrants; and a plurality of longitudinal ribs integrally formed in the second layer positioned in the second and fourth quadrants, and a plurality of transverse ribs integrally formed in the second layer positioned in the first and third quadrants.

In yet another aspect, an embodiment of the present disclosure may provide mat unit comprising: four quadrants defined by an imaginary transverse midline perpendicularly intersected an imaginary longitudinal midline; an upper surface spanning the four quadrants; a lower surface spanning the four quadrants below the upper surface; a transversely extending first rib forming a portion of the upper surface in a first quadrant; a longitudinally extending second rib forming a portion the upper surface in a second quadrant; a transversely extending third rib forming a portion of the upper surface in a third quadrant; and a longitudinally extending fourth rib forming a portion of upper surface in a fourth quadrant. This embodiment may further a plurality of transversely extending ribs integrally formed in the first layer positioned in the first and third quadrants, wherein the plurality of transversely extending ribs define gaps therebetween adapted to permit debris removed from a shoe to fall therethrough.

Additionally, this embodiment may provide a plurality of longitudinally extending ribs integrally formed in the first layer positioned in the second and fourth quadrants, wherein the plurality of longitudinally extending ribs define gaps therebetween adapted to permit debris removed from a shoe to fall therethrough; and a plurality of longitudinal ribs integrally formed in the second layer positioned in the second and fourth quadrants, and a plurality of transverse ribs integrally formed in the second layer positioned in the first and third quadrants. Furthermore, this embodiment may provide a first side spaced from a second side, wherein the imaginary longitudinal midline extends from the first side to the second side; a first end spaced form a second end, wherein the imaginary transverse midline extends from the first end to the second end; wherein the first quadrant is positioned 180° from the third quadrant, and the second quadrant is positioned 180° from the fourth quadrant; a first male connector in the first quadrant and a first female connector in the first quadrant, wherein the first male connector is positioned orthogonal relative to first female connector.

In this embodiment, there may also be a second male connector in the second quadrant and a second female connector in the second quadrant, wherein the second male connector is positioned orthogonal relative to second female connector; and wherein the second male connector is substantially parallel to the first female connector, and the second female connector is substantially parallel to the first male connector. The first and second male connectors and the first and second female connectors may be formed integrally with the plurality of transversely extending ribs integrally and the plurality of longitudinally extending ribs from a non-vinyl nontoxic thermoplastic elastomer (TPE) material. The upper surface formed from TPE material may be ultrasonically welded to lower surface which is also formed from TPE material, wherein the ultrasonic weld location of the upper surface to the lower surface is uniform across a weld junction defining a permanent connection of the lower surface to the upper surface. The second and fourth quadrants orthogonally adjacent the first quadrant may include an opposite gender connector aligned in a parallel plane with the respective first male and female connectors of the first quadrant.

In another aspect, an embodiment of the present disclosure may provide an omnidirectional travel path associated with customer movement atop the upper surface, wherein a plurality of ribs in each quadrant collectively remove debris from shoes moving in any direction. The travel path is offset parallel to an imaginary longitudinal midline extending from a first side to a second side of the mat, wherein the travel path first passes over a longitudinally aligned gap formed in the upper surface and then passes over a transversely aligned gap formed in the upper surface, wherein the transversely aligned gap is orthogonal to the longitudinally aligned gap. Alternatively, the travel path may be offset parallel to an imaginary transverse midline extending from a first end to a second end of the mat, wherein the travel path first passes over a transversely aligned gap formed in the upper surface and then passes over a longitudinally aligned gap formed in the upper surface, wherein the transversely aligned gap is orthogonal to the longitudinally aligned gap.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 4 is a side elevation view taken along line 4-4 in FIG. 2;

FIG. 5 is an enlarged side elevation view of the region labeled "SEE FIG. 5" in FIG. 4;

FIG. 8 is a transverse cross section taken along line 8-8 in FIG. 7 depicting the connection between adjoining mat units;

FIG. 9 is a longitudinal cross section taken along line 9-9 in FIG. 7 depicting the connection between adjoining mat units;

Similar numbers refer to similar parts throughout the drawings.

DETAILED DESCRIPTION

Figure 1:
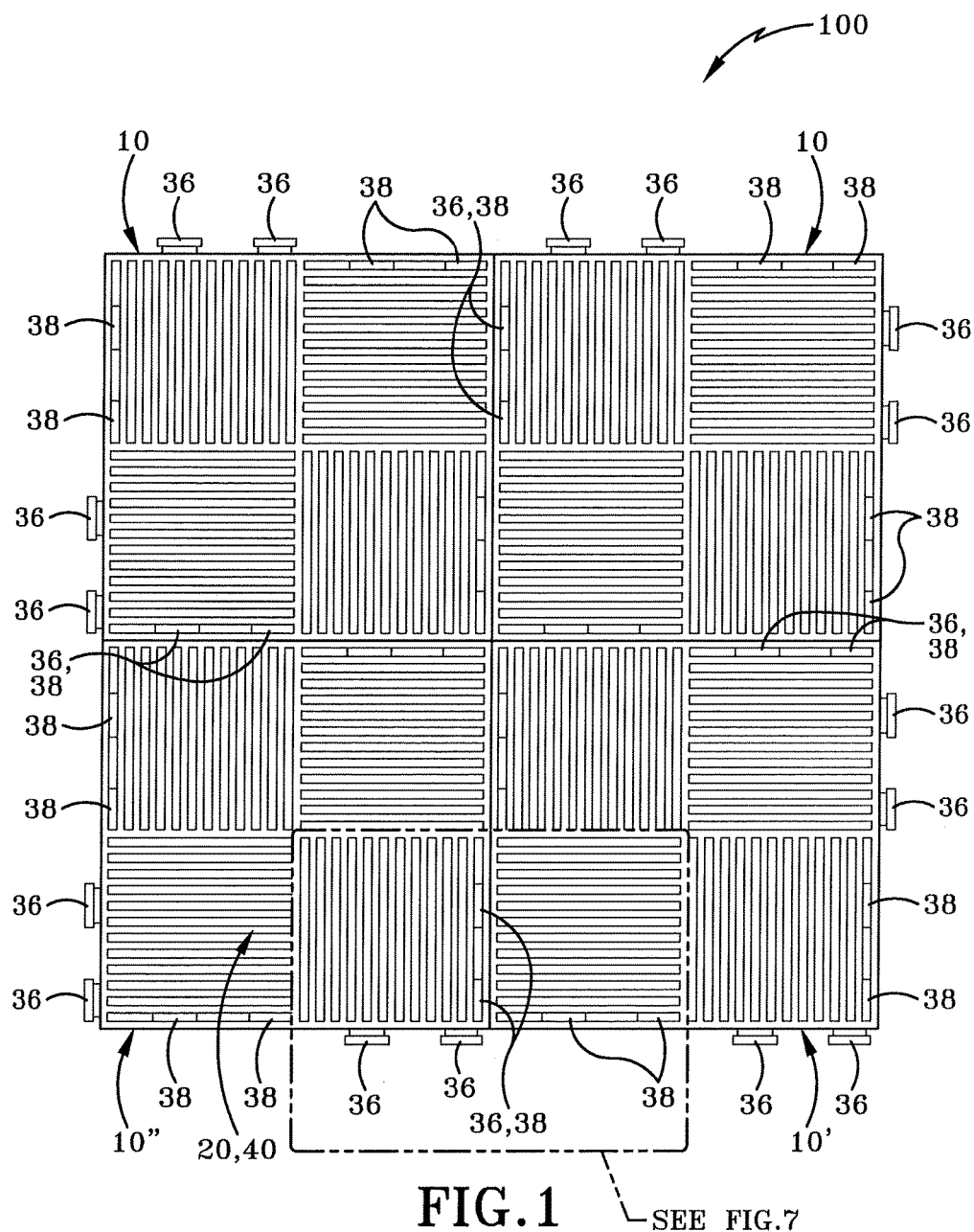
FIG. 1 is a top plan view of a mat system formed from connected mat units, and more particularly four mat units are shown connected together.

As depicted in FIG. 1, a mat system 100 is shown as having a plurality of interconnected or interlocked single tiles or mat units 10. When the plurality of mat units 10 are connected together, the assembled mat system 100 forms a general basket weave pattern when viewed from above.

Figure 2:
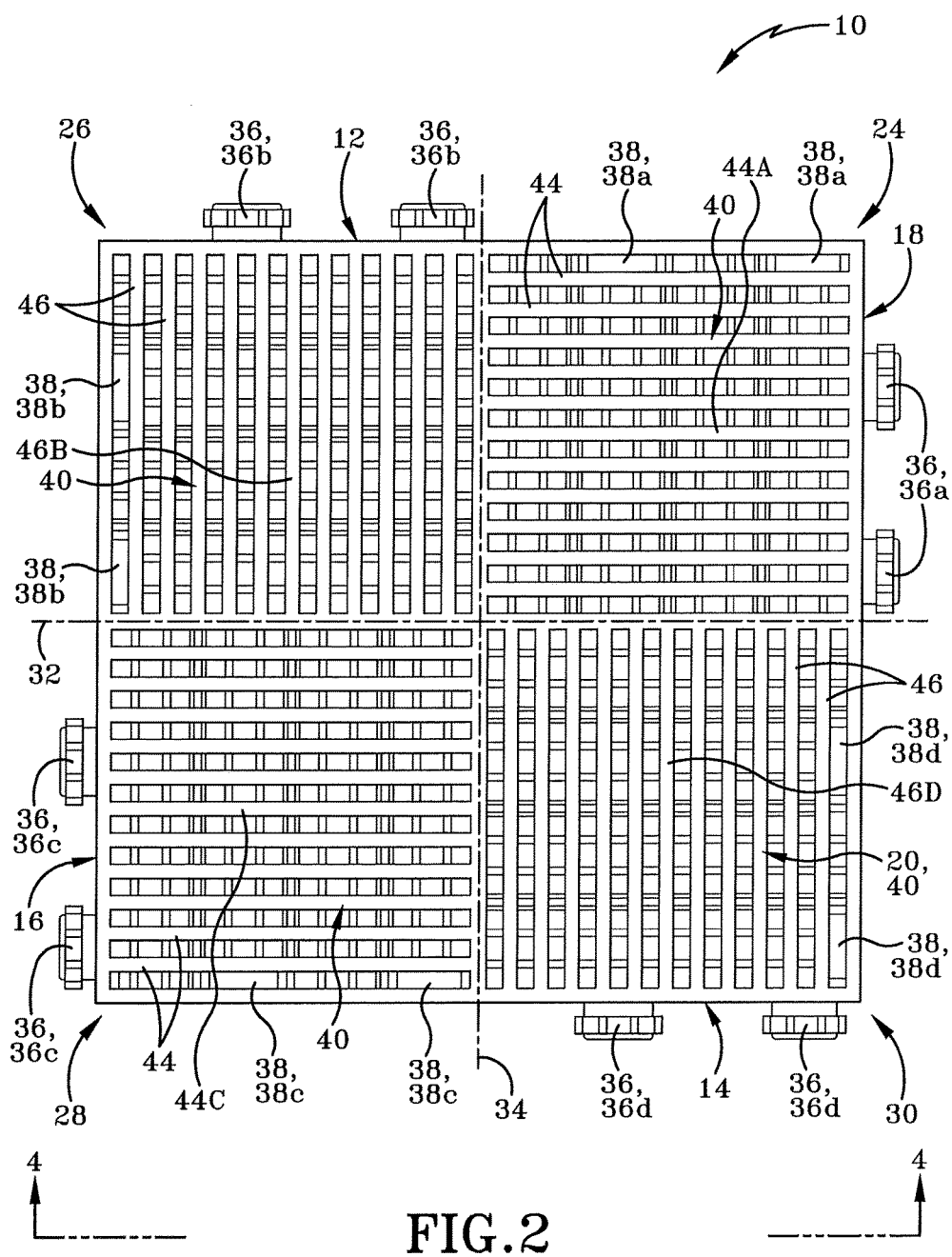
FIG. 2 is a top plan view of a single mat unit having four quadrants.

As depicted in FIG. 2, a single tile or mat unit 10 includes a first side 12 opposite a second side 14 defining a longitudinal direction therebetween, a third side 16 opposite a fourth side 18 defining a transverse direction therebetween, and an upwardly facing top surface 20 opposite a downwardly facing bottom surface 22 defining a vertical direction therebetween. Single mat unit 10 further includes four quadrants, namely, a first quadrant 24, a second quadrant 26, a third quadrant 28, and a fourth quadrant 30. The quadrants are defined by a transversely extending midline 32 perpendicularly intersecting a longitudinal midline 34.

Each quadrant defines a portion of a pair of connectors. Male connectors 36 extend outwardly from the side of the respective quadrant. Each quadrant defines female connectors 38 which are offset generally orthogonally to male connectors 36. Additionally, in an adjacent quadrant, an opposite gender connector is substantially coplanar with an opposite gender connector of the first quadrant. For example, looking towards the first quadrant 24, the male connectors 36a extend outwardly to the right when viewing single tile unit 10 from above. Female connectors 38a are adjacent first side 12 and the second quadrant 26 is positioned to the left or towards the third side 16 and has male connectors 36b extending in the same direction of the first side 12 as the female connectors 38a. Female connectors 38b in second quadrant 26 are generally aligned longitudinally orthogonal to that of male connectors 36b in second quadrant 26. Stated otherwise, within each quadrant, the female connectors 38 are aligned in a single direction and the male connectors 36 are aligned in an orthogonal direction to that of female connectors 38. Male connectors 36 offset to one side of longitudinal midline 34 lie in the same direction as female connectors 38 on an opposite side of midline 34. For example, male connectors 36c in the third quadrant 28 are arranged in the same direction as female connectors 38d in the fourth quadrant 30 opposite longitudinal midline 34. Male connectors 36 are arranged in the same direction as female connectors 38 opposite transverse midline 32. For example, male connectors 36b in the second quadrant 26 are arranged in the same direction as female connectors 38c in the third quadrant 28. The spacing of connectors 36, 38 on single mat unit 10 enables unit 10 to be assembled with other identical tile units in order to construct a flooring mat system as shown in FIG. 1 and as will be described in greater detail below.

Each mat unit 10 includes an upper first layer 40 and a lower second layer 42. Upper layer 40 may also be referred to as a first layer 40. Lower layer 42 may also be referred to as a second layer 42. The upper layer 40 includes a plurality of transversely extending linear ribs 44 and a plurality of linearly extending longitudinal ribs 46. In the shown embodiment of FIG. 2, the transverse linear ribs 44 are positioned in the first quadrant 24 and the third quadrant 28 which is aligned diagonally or 180° from the first quadrant 24. The plurality of longitudinally extending linear ribs 46 are disposed in the second quadrant 26 and the fourth quadrant 30. The second quadrant 26 is diagonally opposite the fourth quadrant 30 or 180° therefrom. Arranging the transverse linear ribs in a quadrant 180° from the next set of transversely extending linear ribs creates a basket weave pattern which may also be referred to as a standard block pattern of a plurality of mat rib units when they are assembled in a flooring system. One exemplary and non-limiting distinction of the mat system 100 utilizes units 10 is that each unit 10 includes the upper surface altering directions in each quadrant. Thus, if an installer desired to create a basket weave pattern with conventional slotted mats, it would require four individual mat units positioned orthogonal relative to each other, whereas mat unit 10 accomplishes this feat in a single unit, rather than a combination of four.

Figure 3:
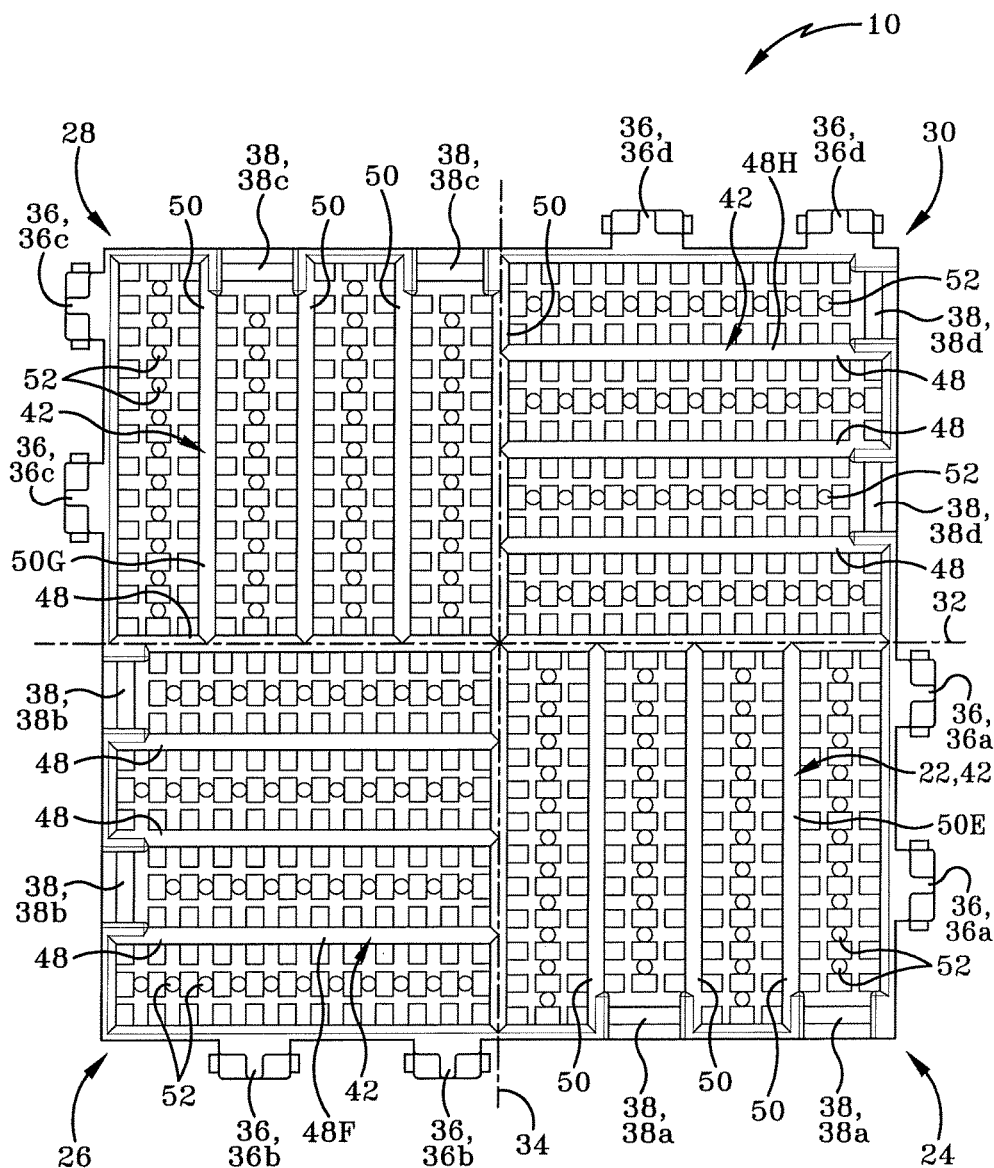
FIG. 3 is a bottom plan view of the single mat unit.

As depicted in FIG. 3, lower layer 42 includes a plurality of transversely extending lower layer linear ribs 48 and a plurality of longitudinally extending lower layer linear ribs 50. The lower level transverse linear ribs 48 are positioned beneath portions of the upper layer 40 that form longitudinal linear ribs 46. For example, lower level transverse linear ribs 48 formed in lower layer 42 are positioned vertically beneath longitudinal linear ribs 46 formed in upper layer 40. Thus, the lower layer transverse linear ribs 48 are formed in the second quadrant 26 and the fourth quadrant 30. Additionally, since the lower level ribs are orthogonal to the top upper layer ribs, the plurality of lower level longitudinal linear ribs 50 are formed beneath portions of the upper layer 40 that define transverse linear ribs 44. Thus, the lower level longitudinal ribs 50 are formed in the first quadrant 24 and the third quadrant 28. For example, first quadrant 24 includes lower level longitudinal layer ribs 50 and third quadrant 28 includes lower level longitudinal linear ribs 50 which are each vertically beneath transverse linear ribs 44 formed in the upper layer 40. The orthogonal arrangement between the upper layer 40 and the lower layer 42 provides overall rigidity and strength to mat unit 10. Additionally, lower layer 42 may include a plurality of gripping feet 52 arranged throughout the lower layer extending from the downwardly facing bottom surface 22 such that feet 52 engage a subfloor surface.

As depicted in FIG. 4 and FIG. 5, the male connectors 36 and the female connectors 38 are offset on opposite sides of longitudinal midline 34 with respect to a single mat unit 10. In one particular embodiment, two female connectors are positioned offset on the same side relative to longitudinal midline 34. More particularly, a first female opening 60 is positioned outwardly relative to a second female connector 62 which is positioned inwardly closer to longitudinal midline 34. The first and second female openings 60, 62 are bound by upper most edge 64 which is located approximately half way relative to the vertical height 66 which may also be referred to as thickness 66 of mat tile unit 10.

In one particular embodiment, thickness 66 is preferably less than 0.5 inches so that mat tile unit 10 may fit beneath low clearance doors more easily. Furthermore, it may be desirable for the mat thickness 66 to be not more than about 0.4 inches to ensure proper clearance under low hanging doors.

The opening to first female connectors 38 forms a generally L-shaped passageway which will be described in greater detail below. Only a first leg 68 of the L-shaped passageway is seen in FIG. 4 inasmuch as the second leg 70 (FIG. 8) extends upwardly through the mat 10. The L-shaped passageway is configured to receive one of the male connectors 36 which is shaped complementary to the L-shaped passageway as indicated in FIG. 5.

With continued reference to FIG. 5, the male connectors 36 may be an equal number of connectors to that of the opposite gender. In this instance, there are two male connectors 36 located offset to one side of longitudinal midline 34. Each male connector 36 is generally L-shaped including a horizontally extending first leg 72 and a vertically extending second leg 74. The first horizontal leg 72 extends outwardly from a vertical sidewall 76. Upwardly facing top surface of first leg 72 is located approximately halfway relative to the vertical thickness 66 such that it corresponds to fit beneath a top edge 64 of female connector 38. Furthermore, first leg 72 has a horizontal length complementary to that of first passageway leg 68 of female connector 38 to enable the horizontal leg 72 of male connector 36 to slidably be received therein. The second vertical leg 74 extends upwardly from a rigid connection with the top surface of first horizontal leg 72 and is spaced apart from vertical sidewall 76 defining a gap 80 therebetween. Gap 80 has a spaced apart distance complementary to that of a portion of the mat defining the L-shaped passageway of female connector 38 to enable the top portion of the mat 10 to be received in gap 80. When the male connector 36 is attached to the female connector 38, top edge 64 of female connector 38 is disposed entirely within gap 80 between vertical wall 76 and vertical leg 74.

Second leg 74 is capped with a cap member 82. Cap 82 includes a length that is greater than that of the second vertical leg 74 upon which cap 82 resides. The greater length of cap 82 defines an overhang 84 on each side of cap 82. Overhang 84 may further be defined by inwardly and upwardly tapering edge 86. Cap 82 may further include one or more upwardly extending nubs 88 extending upwardly from the top surface of cap 82 but terminating below the upwardly facing top surface 20 of upper layer 40.

Figure 6:
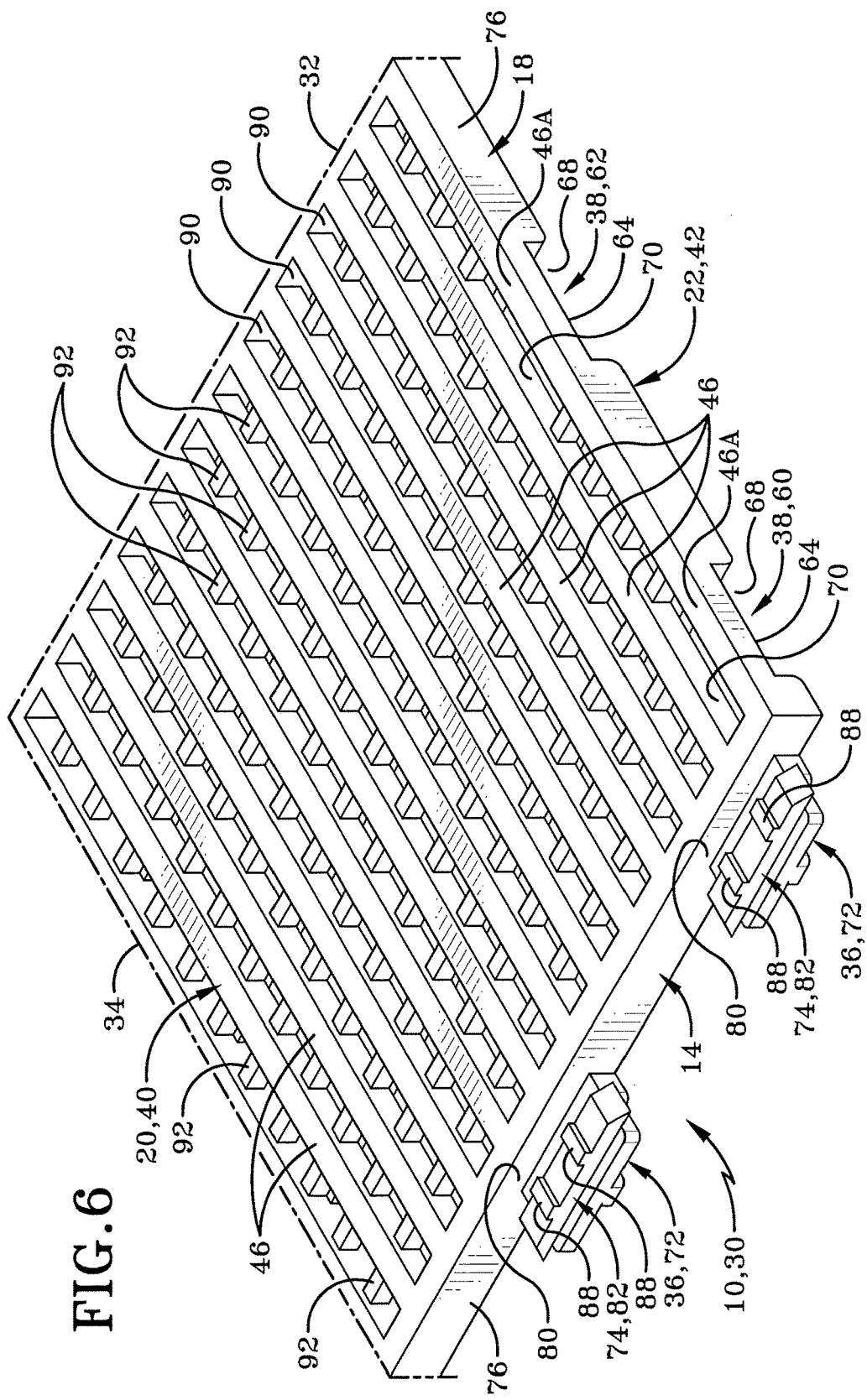
FIG. 6 is an enlarged top perspective view of a first quadrant of a single mat unit.

As depicted in FIG. 6, the plurality of longitudinally extending linear ribs 46 are spaced apart from each other preferably at even intervals defining gaps 90 therebetween. The gaps 90 are also aligned longitudinally similar to that of linear ribs 46. Within each gap 90 are a plurality of lower support members 92 which act as secondary ribs to extend between adjacent spaced apart pairs of linear ribs 46. The secondary ribs, or support members 92, are short pieces of material spaced apart from each other within a gap 90 and oriented orthogonal to that of the ribs they extend between. For example, in FIG. 6, with the longitudinally extending ribs 46, the secondary ribs or support members 92, would be generally aligned in the transverse direction. The same holds true for the second quadrant 26. However, with respect to the first quadrant 24 and the third quadrant 28 that has transversely extending ribs 44 defining gaps therebetween, the secondary ribs or support members 92, in the first quadrant 24 and in the third quadrant 28 are oriented in the longitudinal direction which is orthogonal to that of transverse ribs 44. Secondary ribs 92 are considered part of the upper layer 40 inasmuch as they are formed during the upper layer formation process as will described in greater detail below. The secondary ribs 92 include an upwardly facing top surface that is disposed at a lower vertical level than upper surface 20 defined by ribs 44 and ribs 46.

Preferably, the upwardly facing top surface of secondary ribs 92 is at a similar vertical height of the upwardly facing top surface of nubs 88. Additionally, with respect to nubs 88, the secondary ribs 92 in a respective quadrant are oriented orthogonal to the nubs 88 on male connector 36. For example, as depicted FIG. 7, nubs 88 are aligned generally in the transverse direction similar to that of transversely extending linear ribs 44 and the secondary nubs 92 are generally aligned in a longitudinal direction. The same holds true for the remaining quadrants. When nubs 88 are aligned orthogonal to secondary ribs 92 in a respective quadrant, it enables the nubs 88 to be aligned complementary to the nubs 88 in adjoining mat tile unit 10 which will be described in greater detail below.

Figure 7:
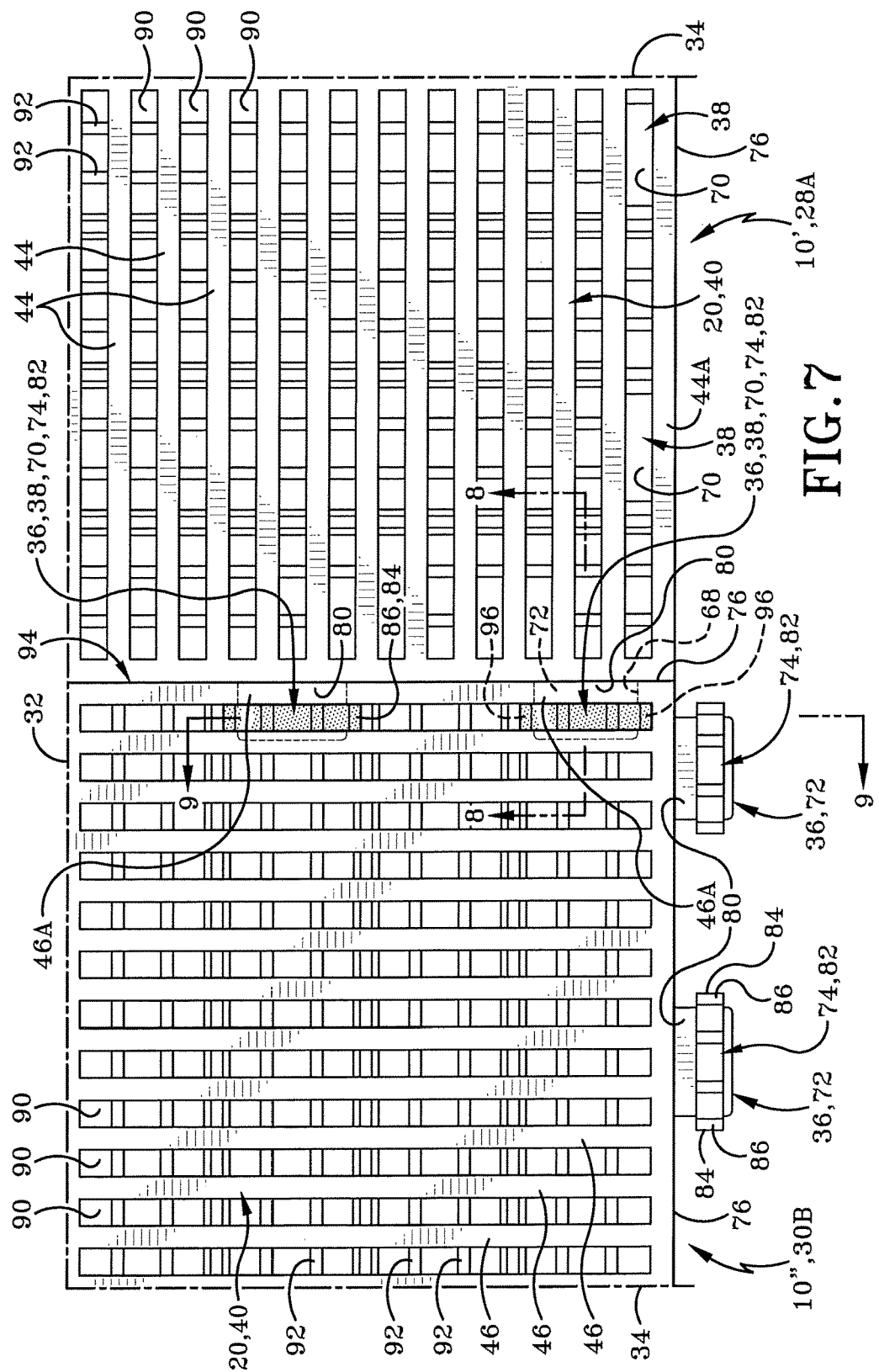
FIG. 7 is an enlarged top plan view of the region labeled "SEE FIG. 7" in FIG. 1 depicting the connection between adjoining mat units.

As depicted in FIG. 7, when two adjoining mat tile units 10 are connected they form a union 94. In this example, union 94 is defined between a third quadrant 28A on a first mat tile unit 10' and fourth quadrant 30B on a second mat tile unit 10". Furthermore, the outermost edges defined by sidewall 76 may be flush when first mat 10' is connected with second mat 10". There may be some instances where the vertical sidewall 76 forms the outermost edge of the assembled mat system. In this instance, an operator would cut off the outwardly extending male connectors 36 by slicing through first legs 72 with a utility knife or other sharp object to enable the assembled mat tile system to be flushly mounted against a wall of the building structure in which the mat tiles 10 or system 100 are to be installed. FIG. 7 depicts the assembled tile units prior to the male connectors 36 being slidably removed from fourth quadrant 30B on second mat tile unit 10".

As depicted in FIG. 8, the L-shaped male connector 36, including first leg 72 and second leg 74, fits in the complementary L-shaped passageway of female connector 38. When male connector 36 is connected with female connector 38, the downwardly facing bottom surface of first leg 72 is flush with the bottom surface 42 of second layer 22. The upwardly facing top surface of second leg 74 is generally flush with upwardly facing top surface 40 of upper layer 20. An outer perimeter rib 46A defines surface 76 and is positioned in gap 80. Note: the outer perimeter rib 46A is in the second quadrant 26 and fourth quadrant 30 and an outer perimeter rib 44A corresponds to the first and third quadrants.

FIG. 9 depicts the connection of male connector 36 with female connector 38. Particularly, the overhang 84 on cap 82 is received by and is supported on a ledge 96 defining a portion of the passageway of female connector 38. When assembled, the overhang 84 acts similar to a hook to substantially preclude male connector 36 from disconnecting with female connector 38. Stated otherwise, male connector 36 is one-way flexible which enables the male connector 36 to pass upwardly through the vertical portion 70 of L-shaped passageway of female connector 38 such that the overhang 84 flexes downwardly and tapered wall 86 moves upwardly over ledge 96. When the terminal end of tapered wall 86 passes vertically above ledge 96, it flexes outwardly and rests above ledge 96. The tapered wall 86 provides structural support to preclude downward movement of male connector 36 such that male connector 36 is effectively hooked to female connector 38 to ensure that adjoining mat tile units 10' and 10" remain connected together when the system 100 is fully assembled as indicated in FIG. 10.

Figure 10:
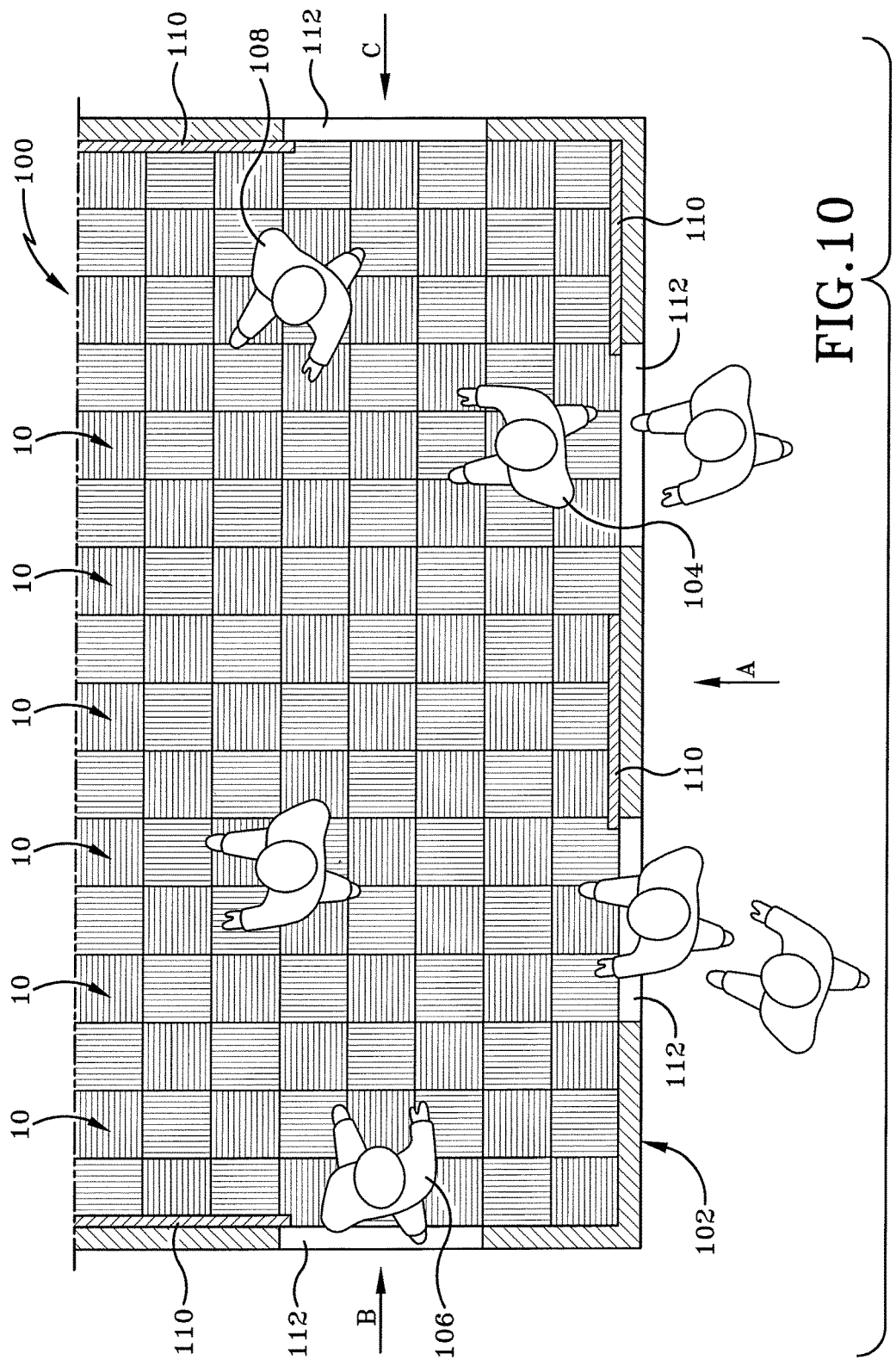
FIG. 10 is an environmental top plan view of the mat system depicting omnidirectional paths of travels of persons moving atop the mat system.

FIG. 10 depicts a plurality of individual mat tile units 10 assembled together to form an omnidirectional mat cleaning system 100. System 100 enables a person walking above the connected mat tile units 10 to have their shoes cleaned regardless of the direction from which they enter a building structure 102. For example, a first individual 104 may be moving in the direction of arrow A. While moving in the direction of arrow A, the first individual 104 may have their shoes cleaned by the plurality of ribs that are aligned generally orthogonal to the direction of travel along arrow A. A second individual 106 may be moving in the direction of arrow B which is generally orthogonal to that of arrow A. The second individual 106 may have their shoes cleaned by the plurality of ribs that are aligned generally orthogonal to the direction of travel of second individual 106 along arrow B. Similarly, third individual 108 may be entering the building 102 from another direction moving in the direction of arrow C and may have their shoes cleaned by the portions of mat tile units 10 that are aligned orthogonal to the directional movement along arrow C. FIG. 10 further depicts one or more sliding doors 110, as one as having ordinary skill in the art would understand, to provide ingress and egress through door openings 112 defined by building structure 102. As discussed above, doors 110 may be low profile doors that require the thickness 66 of the assembled mat system 100 to be of a substantially low profile and not having a thickness greater than about 0.4 inches.

Traditionally, flooring mats are fabricated from vinyl and other polymers which manufacturers believe increases the durability of the mat. However, the use of vinyl during the fabrication process, which is often molded plastic, releases a plurality of noxious and potentially toxic off gases which are clearly harmful both to human machine operators and the environment in general. In conventional two-layer mat systems having an upper layer and a lower layer, when each layer is formed of vinyl, the upper layer and lower layer are adhered together with an adhesive and pressure is applied between the upper layer and lower layer until the adhesive cures securing the upper and lower layer together.

In accordance with one aspect of the present disclosure, single mat unit 10 is fabricated from a non-vinyl/TPE material. In doing so, single mat unit 10 upper layer 40 and lower layer 42 incorporate green technology to eliminate any noxious or toxic or noxious off gases during the molding process of upper layer 40 and lower layer 42. Further, fabrication of single mat unit 10 eliminates the need for any adhesive to bind the upper layer 40 to lower layer 42 during unit 10 fabrication.

Upper layer 40 and lower layer 42 fabricated from non-vinyl TPE allow these respective layers to be permanently and fixedly joined together through an ultrasonic welding process. Particularly, upper layer 40 is formed within a mold from non-vinyl TPE. Then, lower layer 42 is formed from non-vinyl TPE in a mold. The lower layer and the upper layer are orthogonally aligned such that their respective longitudinal and transverse linear ribs intersect each other at right angles. Then, with the upper layer and the lower layer adjoining each other, they are operatively connected to an ultrasonic welding machine which produces a high frequency sonic wave to excite the non-vinyl TPE particles in each of the upper layer 40 and lower layer 42. As the particles forming the respective layers are excited through the ultrasonic welding machine, the particles rapidly excite and bond with each other creating a uniform material defining a permanent junction between the upper layer 40 and lower layer 42 at welding contact points. After the ultrasonic welding machine has been deactivated, mat 10 is allowed to cure. Single mat unit 10 is fabricated from the two layers permanently joined together free of any adhesive between the upper layer and the lower layer. Further, there is no mechanical attachment devices (i.e., stitching or nuts/bolts/screws) connecting the first layer to the second layer.

Typically, the ultrasonic welding device or system utilized to join the first layer 40 with the second layer 42 may include press to put the two parts (i.e., the first layer 40 and the second layer 42) to be assembled under pressure. The ultrasonic welding device may also include a nest or anvil where the parts (i.e., the first layer 40 and the second layer 42) are placed and allowing the high frequency vibration to be directed to the interfaces (the welding contact points). The ultrasonic welding device may also include an ultrasonic stack composed of a converter or piezoelectric transducer, an optional booster and a sonotrode. These elements electrically and acoustically cooperate and are specifically tuned to resonate at the same exact ultrasonic frequency (Typically 20, 30, 35 or 40 kHz). Other common frequencies used in ultrasonic welding of thermoplastics are 15 kHz, 20 kHz, 30 kHz, 35 kHz, 40 kHz and 70 kHz. The ultrasonic welding device may also include a converter configure to convert an electrical signal into a mechanical vibration. The ultrasonic welding device may also include a booster that modifies the amplitude of the vibration. It may also be used in standard systems to clamp the stack in the press. The ultrasonic welding device may also include a sonotrode to apply the mechanical vibration to the parts (i.e., the first layer 40 and the second layer 42) to be welded. The ultrasonic welding device may also include an electronic ultrasonic generator delivering a high power AC signal with frequency matching the resonance frequency of the stack. The ultrasonic welding device may also include a controller controlling the movement of the press and the delivery of the ultrasonic energy.

Figure 11:
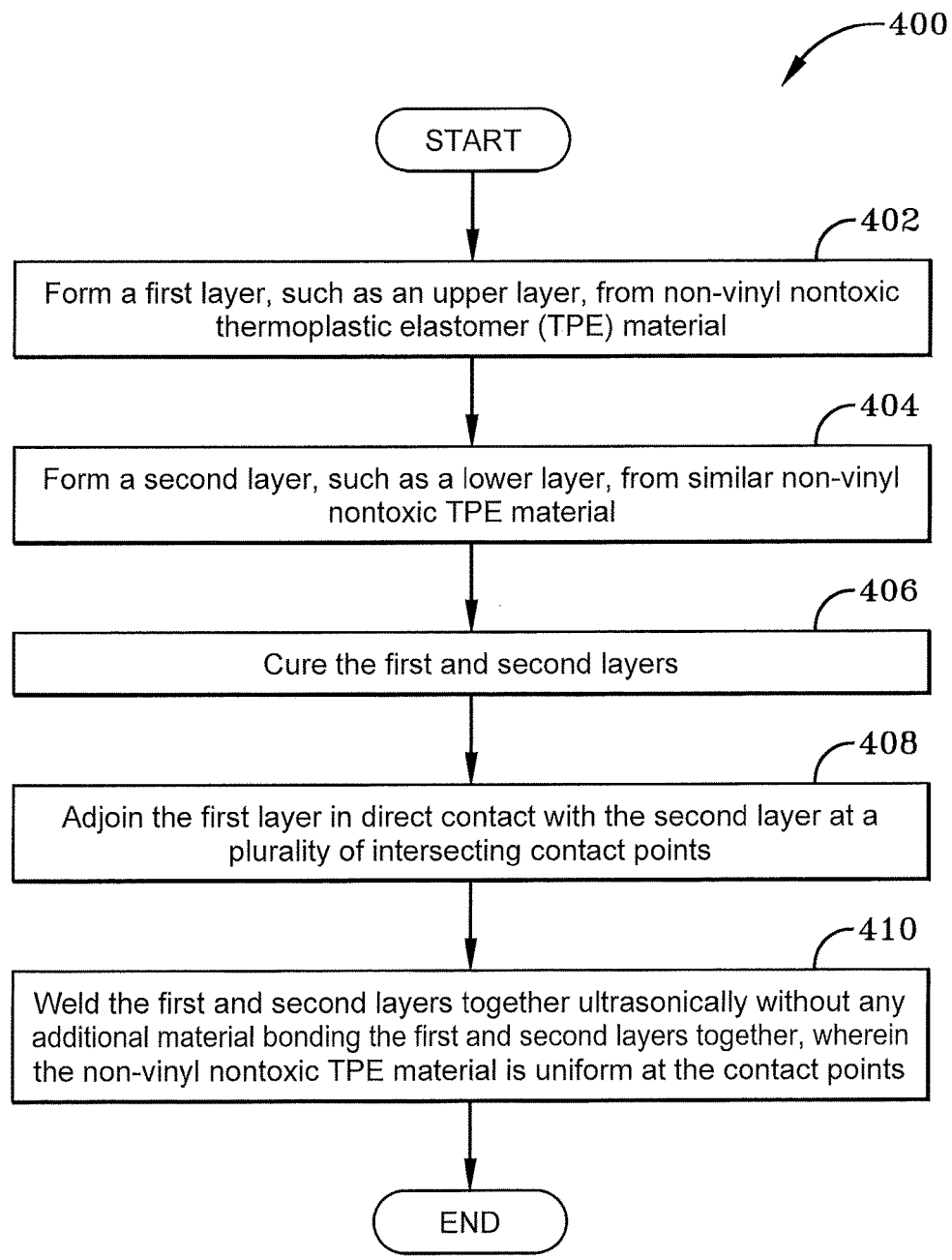
FIG. 11 is a flow chart detailing an exemplary method of fabricating the single mat unit from non-vinyl materials.

In operation and as depicted in the flow chart of FIG. 11, a method of fabricating a mat unit 10 for a flooring mat system is generally shown at 400. Forming a first layer, such as the upper layer 40, from non-vinyl nontoxic thermoplastic elastomer (TPE) material is shown generally at 402. This step may be accomplished by molding the first layer in a mold to a desired shape. As shown in the figures, the shape of the first layer is typically rectangular having four quadrants, wherein alternating quadrants can include longitudinally extending and transversely extending linear ribs.

Then, forming a second layer, such as the lower layer 42, from similar non-vinyl nontoxic TPE material is generally depicted at 404. This step may be accomplished by molding the first layer in a mold to a desired shape. As shown in the figures, the shape of the second layer is typically rectangular having four quadrants, wherein alternating quadrants can include longitudinally extending and transversely extending linear ribs that are offset one quadrant (i.e. rotated 90 degrees) from the design of the first layer.

The first and second layers may be allowed to at least partially cure, which is generally depicted at 406. Then, adjoining the first layer in direct contact with the second layer at a plurality of intersecting welding contact points, which is generally indicated at 408.

Thereafter, welding the first and second layers together ultrasonically without any additional material bonding the first and second layers together, wherein the non-vinyl nontoxic TPE material is uniform at the welding contact points is shown generally at 410. The step of welding the first and second layers together ultrasonically may be accomplished on a ultrasonic welding machine, which by way of non-limiting example may use high-frequency ultrasonic acoustic vibrations locally applied to the upper layer 40 and lower layer 42 being held together under pressure to create a solid-state weld at the welding contact points. In ultrasonic welding, there are no connective bolts, nails, soldering materials, or adhesives necessary to bind the materials together.

Once the first and second layers have been ultrasonically joined together, the manufacturer may add additional components to the assembled mat unit. For example, the mat unit may have non-slip material coupled to the upwardly facing top surface in order to prevent a person from walking on the assembled mat system from slipping or falling. Alternatively, other materials may be coupled to the upwardly facing top surface in remove debris from a shoe as a person walks over the mat. In some versions, this step may allow the use of a non-toxic adhesive to attach the debris removing or non-slip materials to the upper layer 40. However, there are ways to form the mat tile unit such as having a groove formed in the upwardly facing top surface that receives a non-slip material or debris removing material in a frictional interference fit.

Subsequent to the steps of forming a mat unit 10, the mat units 10 may be packaged and sold to a customer or distributor for installation. In one particular non-limiting embodiment, the mat units 10 are installed in an entranceway to a commercial business (FIG. 10). The assembled mat systems serves the purpose of removing debris from shoes prior to a customer entering a store. Additionally, the assembly mat system may reduce the likelihood of a person slipping when entering the store.

As depicted in FIG. 7, FIG. 8, and FIG. 9, during installation of mat system 100, a single mat unit 10 is aligned side-to-side with another identical mat unit. The arrangement of the male and female connectors on each mat unit enable the two mat units arrange side-to-side to connect. For the purpose of this example, the two mat units will be referred to as a left unit (such as 10") and a right unit (such as 10') for explanative purposes, however it should be understood that these directions are non-limiting and used for ease of explanation.

A left mat unit 10" may be placed to the left of a right mat unit 10'. The left unit 10" may have at least two female connectors on its right side. The right unit 10' may have at least two male connectors on its left side. Thus, when the left and right units are placed side-to-side, an installer may connect the male connector of the right unit 10' with the female connector of the left unit 10".

The installer may continue this pattern of connecting adjacent male-female connectors to construct the mat system, such as shown in FIG. 10, to fit within the install location, preferably a commercial entranceway. The basket weave pattern formed from the assembled mat system encourage debris removal as patrons walk over the mat system, regardless of their path of travel. Further the spaced apart linear ribs formed in the layers defining gaps 90 permit debris to drop through the gaps 90 where they may be later removed during a floor cleaning process.

Additionally, portions of the appended claims refer to different numerical ribs. For further description thereof, it is shown in FIG. 2 and FIG. 3 that a transversely extending first rib 44A is in the first quadrant 24. A longitudinally extending second rib 46B is in the second quadrant 26. A transversely extending third rib 44C is in the third quadrant 28. A longitudinally extending fourth rib 46D is in the fourth quadrant 30. Collectively, ribs 44A, 46B, 44C, and 44D are all formed in the upper first layer 40. A longitudinally extending fifth rib 50E is in the first quadrant 24 below the first rib 40A. A transversely extending sixth rib 48F is in the second quadrant 26 below the second rib 46B. A longitudinally extending seventh rib 50G is in the third quadrant 28 below the third rib 44C. A transversely extending eighth rib 48H is in the fourth quadrant 30 below the fourth rib 44D. Collectively, ribs 50E, 48F, 50G, and 48 H are all formed in the lower second layer 42.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. A single mat unit comprising:
   four quadrants of the single mat unit defined by an imaginary transverse line intersected with an imaginary longitudinal line, and the four quadrants including a first quadrant, a second quadrant, a third quadrant, and a fourth quadrant;
   an upper surface of the single mat unit spanning the four quadrants, wherein the upper surface is formed from a non-vinyl nontoxic thermoplastic elastomer (TPE) material;
   a lower surface of the single mat unit spanning the four quadrants below the upper surface;
   a plurality of transversely extending ribs defining a portion of the upper surface in the first and third quadrants, wherein the plurality of transversely extending ribs define transversely extending gaps therebetween adapted to permit debris removed from a shoe to fall therethrough independent of the shoe's directional movements above the single mat unit;
   a plurality of longitudinally extending ribs defining a portion of the lower surface in the first and third quadrants, wherein the plurality of longitudinally extending ribs define longitudinally extending gaps therebetween that are vertically aligned with the transversely extending gaps thereabove in the first and third quadrants to permit debris to move entirely through the single mat unit;
   a plurality of longitudinally extending ribs defining a portion of the upper surface in the second and fourth quadrants, wherein the plurality of longitudinally extending ribs define longitudinally aligned gaps therebetween adapted to permit debris removed from a shoe to fall therethrough independent of the shoe's directional movements above the single mat unit; and
   a plurality of transversely extending ribs defining a portion of the lower surface in the second and fourth quadrants, wherein the plurality of transversely extending ribs define transversely extending gaps therebetween that are vertically aligned with the longitudinally extending gaps thereabove in the second and fourth quadrants to permit debris to move therethrough entirely through the single mat unit.

2. The single mat unit of claim 1, further comprising:
   an omnidirectional travel path atop the upper surface, wherein the plurality of ribs in each quadrant collectively remove debris from shoes moving in any direction.

3. The single mat unit of claim 1, further comprising:
   a pedestrian travel path offset parallel to the imaginary longitudinal midline extending from a first side to a second side of the single mat unit, wherein the travel path first passes over a longitudinally aligned gap formed in the upper surface and then passes over a transversely aligned gap formed in the upper surface, wherein the transversely aligned gap is orthogonal to the longitudinally aligned gap.

4. The single mat unit of claim 1, further comprising:
   a pedestrian travel path offset parallel to the imaginary transverse midline extending from one side to an opposite side of the single mat unit, wherein the travel path first passes over a transversely aligned gap formed in the upper surface and then passes over a longitudinally aligned gap formed in the upper surface, wherein the transversely aligned gap is orthogonal to the longitudinally aligned gap.

5. The single mat unit of claim 1, further comprising:
   a first side spaced from a second side, wherein the imaginary longitudinal midline extends from the first side to the second side;
   a third side spaced from a fourth side, wherein the imaginary transverse midline extends from the third side to the fourth side; and
   wherein the first quadrant is positioned 180° from the third quadrant, and the second quadrant is positioned 180° from the fourth quadrant.

6. The single mat unit of claim 5, further comprising:
a first male connector in the first quadrant and a first female connector in the first quadrant, wherein the first male connector is positioned orthogonal relative to first female connector;
a second male connector in the second quadrant and a second female connector in the second quadrant, wherein the second male connector is positioned orthogonal relative to second female connector; and
wherein the second male connector is substantially parallel to the first female connector, and the second female connector is substantially parallel to the first male connector.

7. The single mat unit of claim 6, wherein the first and second male connectors and the first and second female connectors are formed integrally with the plurality of transversely extending ribs and the plurality of longitudinally extending ribs from the TPE material.

8. The single mat unit of claim 1, further comprising:
support members positioned in the transversely aligned gaps and the longitudinally aligned gaps aligned orthogonal to the gap in which they are respectively positioned.

9. The single mat unit of claim 8, wherein a top surface on the support members are positioned at a lower vertical height than the upper surface.

10. The single mat unit of claim 1, wherein the lower surface is formed from TPE material.

11. The single mat unit of claim 10, further comprising:
a union of TPE material defining the upper surface and TPE material defining the lower surface.

12. The single mat unit of claim 11, wherein the union is an ultrasonically formed junction between the upper surface and the lower surface.

13. The single mat unit of claim 1, further comprising a mat thickness measured from the upper surface to the lower surface, wherein the mat thickness is less than 0.4 inches thick adapted to establish a low profile adjacent doorways having decreased clearance.

14. An omnidirectional mat cleaning system comprising:
at least one single mat unit including a plurality of longitudinally extending ribs formed in first and third quadrants of an upper first layer having four quadrants defining gaps therebetween and a plurality of transversely extending ribs formed in the first and third quadrants of a lower second layer defining gaps therebetween such that the gaps are in open communication to permit debris to fall entirely through both gaps to pass completely through the at least one single mat unit;
wherein the at least one single mat unit is installed on a floor adjacent a door opening defined by a building structure;
a first direction of travel above the at least one single mat unit extending through the door opening;
a different second direction of travel above the at least one mat single unit extending through the door opening or another door opening defined by the building structure;
wherein the single mat unit cleans debris from shoes regardless of the direction of travel above the at least one single mat unit; and
wherein the at least one single mat unit further includes:
a contact point wherein the upper first layer contacts the lower second layer;
the four quadrants including a first quadrant, a second quadrant, a third quadrant, and a fourth quadrant;
a plurality of longitudinal ribs integrally formed in the first layer positioned in the first and third quadrants and the plurality of longitudinal ribs in the first layer are spaced apart to define longitudinal gaps therebetween entirely vertical through the first layer, and a plurality of transverse ribs integrally formed in the first layer positioned in the second and fourth quadrants;
a plurality of longitudinal ribs integrally formed in the second layer positioned in the second and fourth quadrants, and a plurality of transverse ribs integrally formed in the second layer positioned in the first and third quadrants and the plurality of transverse ribs in the second layer are spaced apart to define transverse gaps therebetween entirely vertical through the second layer; wherein the longitudinal gaps defined by the first layer are in open communication with the transverse gaps defined by the second layer so as to permit debris to fall entirely through both gaps to pass completely through the mat; and
wherein the upper first layer and the lower second layer are formed from a non-vinyl nontoxic thermoplastic elastomer (TPE) material.

15. The omnidirectional mat cleaning system of claim 14, further comprising:
a different third direction of travel above the at least one single mat unit extending through the door opening or another door opening defined by the building structure, and the different third direction of travel is orthogonal to the first direction of travel.

16. The omnidirectional mat cleaning system of claim 15, wherein the second direction of travel is orthogonal to the first direction of travel, and the second direction of travel is opposite the third direction of travel.

17. The omnidirectional mat cleaning system of claim 16, further comprising:
low profile door in the door opening having a decreased clearance, wherein the door opening is adjacent an entranceway to the building structure;
a thickness of the at least one single mat unit that is less than about 0.4 inches that fits beneath the low profile door having the decrease clearance; and
a basket weave pattern formed from the at least one mat single unit encouraging debris removal as patrons walk over the at least one single mat unit, regardless of their direction of travel and permitting debris to drop through the gaps and adapted to be later removed during a floor cleaning process.

\* \* \* \* \*